Jan. 13, 1931. H. G. TAYLOR 1,789,055
SEISMOMETER
Filed Feb. 18, 1928 3 Sheets-Sheet 1
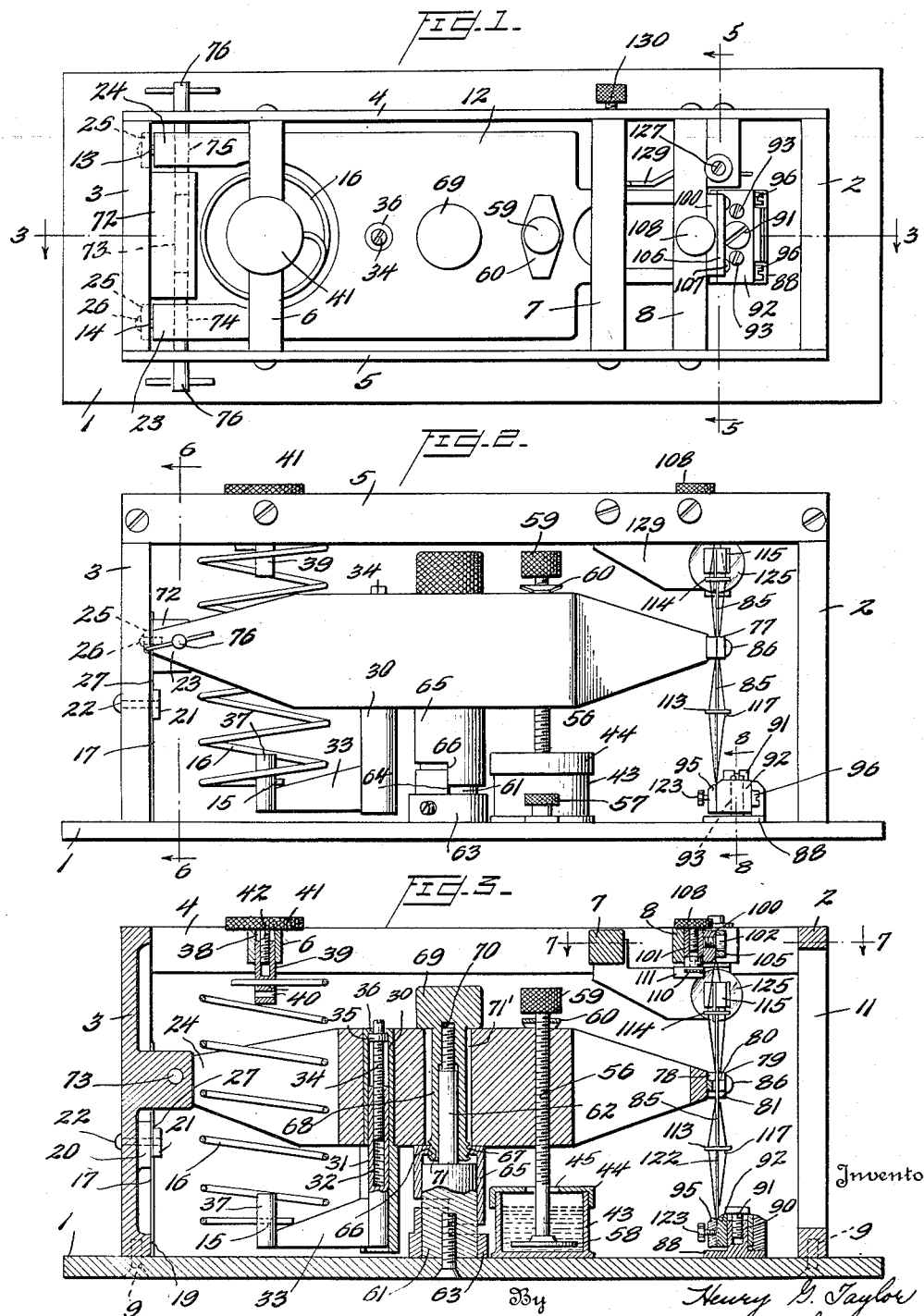

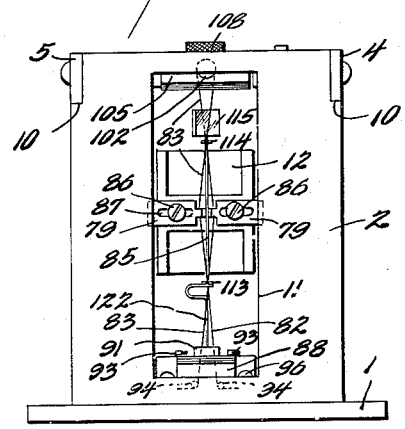

Jan. 13, 1931. H. G. TAYLOR 1,789,055
SEISMOMETER
Filed Feb. 18, 1928 3 Sheets-Sheet 3
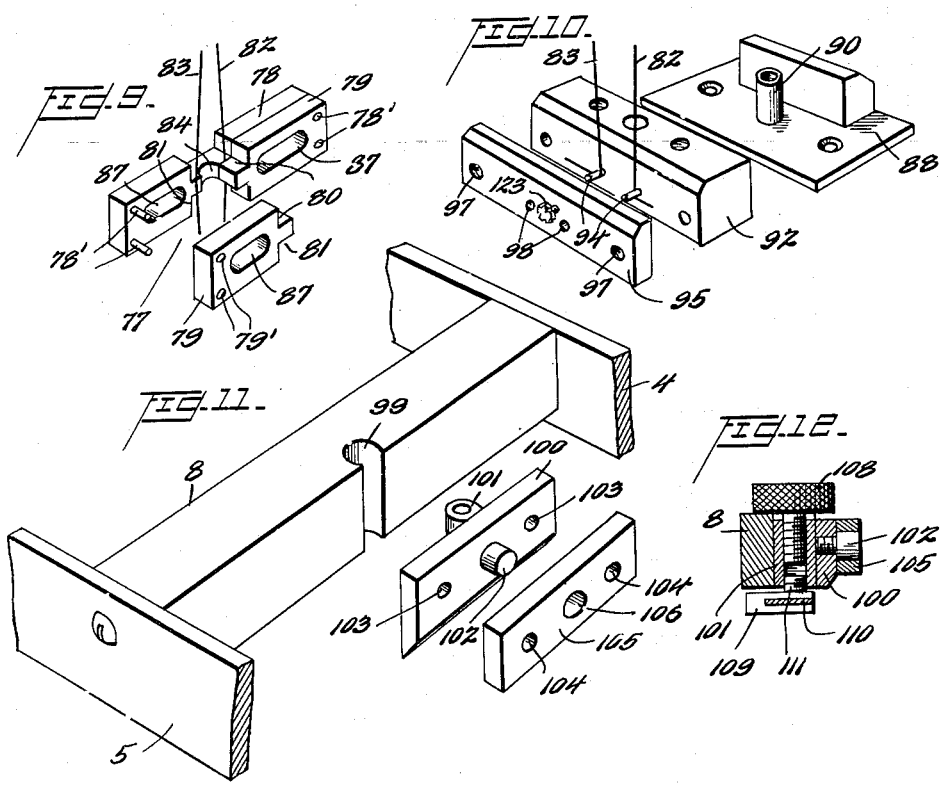

Patented Jan. 13, 1931

1,789,055

UNITED STATES PATENT OFFICE

HENRY G. TAYLOR, OF BEAUMONT, TEXAS, ASSIGNOR TO GEOPHYSICAL EXPLORATION COMPANY, OF BEAUMONT, TEXAS, A CORPORATION OF DELAWARE

SEISMOMETER

Application filed February 18, 1928. Serial No. 255,483.

The invention relates to seismometers, that is, such instruments as respond to and indicate the extent of disturbances in the earth's crust or the vibrations of other bodies.

More specifically, the instrument, which is the subject matter of the present invention, is designed for indicating the duration, amount, and exact nature of vertical displacements in the surface of the earth or other bodies, or the vertical component of such displacements.

The invention has for its object the provision of an instrument which is small and compact, comparatively light in weight, and readily adaptable for field work in geological research; yet, to provide an instrument in which the foregoing features are not in any way attained by a sacrifice of the sensitivity of the instrument.

One of the outstanding aims of the invention is to provide a novel thread suspension for the free end of the inertia mass, which suspension makes possible the conversion of the vertical motion of the inertia mass into a rotary motion so as to make such motion more readily adaptable to registration on a photographic film by means of a ray of light.

It is a further object to provide a thread suspension so that the tension in the threads is constant regardless of the extent of the deflections of the instrument.

It is a still further object to provide a thread suspension which makes possible a high magnification of the deflections of the instrument.

Further objects are to provide novel means for adjustably securing the thread to the inertia mass and to the frame of the instrument, and further to provide means for securely locking the inertia mass in the position of rest.

Other objects and features of novelty will be apparent from the description when taken in connection with the drawings, in which:

Fig. 1 is a plan view looking down on the instrument;

Fig. 2 is a side elevation;

Fig. 3 is a vertical longitudinal section taken on the line 3—3 of Fig. 1;

Fig. 4 is an end elevation looking toward the left in Figs. 1 and 2;

Fig. 5 is an enlarged transverse vertical section taken through line 5—5 in Fig. 1 looking in the direction of the arrows;

Fig. 6 is an enlarged transverse vertical section taken on line 6—6 of Fig. 2 looking in the direction of the arrows;

Fig. 7 is a fragmentary horizontal section taken on line 7—7 of Fig. 3 looking downwardly;

Fig. 8 is a transverse vertical section on line 8—8 of Fig. 2 looking in the direction of the arrows;

Fig. 9 is a detail showing means for securing the threads to the inertia mass;

Fig. 10 is a detail showing means for securing the threads to the base of instrument;

Fig. 11 is a detail showing means for securing the threads to the top frame of instrument;

Fig. 12 is an enlarged sectional view taken on a portion of the line 3—3 of Fig. 1, and showing the means for adjusting the vertical position of the clamp to which the upper ends of the threads are secured;

Fig. 13 is a detail of the thread suspension; and

Fig. 14 is a detail of a modified form of thread suspension.

The frame of the instrument comprises a horizontal base 1, vertically disposed end pieces 2 and 3, and a top section which is made up of longitudinally disposed bars 4 and 5, and transversely disposed cross pieces 6, 7 and 8. The vertically disposed end pieces 2 and 3 are secured to the horizontal base member 1 in any desired manner, as by screws 9. The longitudinally disposed members 4 and 5 of the top section of the frame are secured to the end pieces 2 and 3 in the manner shown in Figs. 4 and 6, wherein the notches 10 are provided in the upper portion of the end pieces, 2 and 3, to receive longitudinal frame members 4 and 5. End piece 2 is provided with an opening 11, as shown in Fig. 4, to permit the admission and reflection of light rays to and from the optical system.

The inertia mass 12 is supported by end piece 3 at 13 and 14, and at 15 by the steel spring 16.

The inertia mass 12 is actually attached to end piece 3 by means of two thin flat steel springs 17 and 18, Fig. 6. The lower extremity of spring 17 rests on base 1, and fits snugly against the lower vertical side of end piece 3, as shown at 19. The spring 17 extends upwardly in a plane parallel to end piece 3, the upper end of the spring extending somewhat above the point of attachment to the inertia mass 12. Midway of its length, spring 17 lies flatly against a projection 20 which is an integral part of the end piece 3. Spring 17 is held firmly in place against projection 20 by means of a small metal cap 21 placed over spring 17, the cap being held securely to end piece 3 by means of screws 22.

Spring 17 is secured to the inertia mass in a similar manner as shown in Fig. 2 and Fig. 6. The end of the inertia mass which is nearest to and supported by end piece 3 is U-shaped, Fig. 1, and is provided with two projections 23 and 24. The vertically disposed spring 17 rests flatly against the butt end of projection 23, and is firmly secured thereto by means of a small flat cap 25 held tightly to the end of projection 23 by means of screws 26. As spring 18 is secured to end piece 3 and to projetcion 24 on inertia member 12 in the same manner as spring 17 is attached to the corresponding members, no further description relative to spring 18 is necessary.

It will be seen, therefore, that, instead of having the end of the inertia mass 12 pivoted directly to the frame, by means of the springs and mode of attachment thereto, just described, the use of a pivot point with its accompanying friction is made unnecessary. It will be apparent from the foregoing description that, instead of being pivoted directly to the frame, the inertia mass, when in motion, oscillates about a point 27 as a center. There is, therefore, no friction between the inertia mass and the supporting frame. The end piece 3 has cut-out portions, as at 28 and 29, Fig. 6, so that the oscillation of the inertia mass will not be impeded.

The third point of suspension 15 of the inertia beam 12 may be vertically adjusted by the following means. Set securely in the beam is the sleeve 30, which is provided throughout that portion which extends below the beam with a vertically disposed slot 31. Within the sleeve 30, and mounted for vertical movement therein, is the internally threaded tubular member 32, provided on its lower end with the horizontally extending arm 33, which extends through and slides in slot 31. The vertical position of the tubular member 32 and its integrally formed arm 33 may be regulated by the externally threaded stud 34, which carries near its upper end a collar 35. The threaded stud 34 may be rotated by any desirable means, as by a screw driver. It will be seen that the collar 35, bearing against the underside of the horizontally disposed upper end portion 36 of sleeve 30, limits the upward movement of stud 34 and the associated tubular sleeve member 32. The tension of spring 16, secured to the vertically projecting stud 37 at 15, prevents any downward movement of the arm 33 except that which is permitted by the adjustment of the stud 34.

It should be considered that the arm 33 is an integral part of the inertia beam 12, and the spring 16 should be thought of as being attached to a low point on the beam. The vertical adjustment of the point of suspension 15 has the effect of changing the free period at which the beam oscillates after displacement.

The tension of spring 16 may be adjusted by the following means. Cross piece 6 of the top section of the frame is provided with a squared hole 38, see Fig. 3, in which is mounted for vertical sliding movement the internally threaded, squared shank 39. The shank 39 is provided at its lower end with one or more openings 40 to receive the upper end of the spring 16. Resting on and supported by crossed piece 6 is the knurled nut 41 having an externally threaded screw portion 42 depending therefrom. It will be seen from an inspection of Figs. 2 and 3 that any rotational motion of knurled nut 41 raises or lowers the position of the squared shank 39 sliding in the squared hole 38.

The spring 16 is made as weak as possible so as to be near its elastic limit, and to increase this effect without decreasing the number of turns in the coil, the spring is wound with some reversed twist, so that it is under considerable strain even when the spring is removed and closed. According to the mode of suspension of the inertia mass as described, the free period of the beam is about three seconds.

The beam 12 is itself made up preferably of an aluminum frame filled with some variety of heavy metal, which has a low melting point, to give the beam the necessary mass concentrated at the center. The shape and general configuration of the inertia mass is well known in Figs. 1 to 3 inclusive, and Fig. 14.

It is, of course, desirable to provide some means of damping the motion of the intertia mass when the instrument is in use. To furnish this, there is provided a cup 43 having a cover 44, through which there is an opening 45 to accommodate the rod 56 which is externally threaded as shown in Fig. 3, so that a limited vertical movement of the rod relative to the beam may be had. The cup 43 may be detachably secured to base 1 by such means as thumb screws 57. The cup 43 is partially filled with oil or other viscous material, which, in cooperation with disk 58 mounted on the lower end of screw 56, has the effect of damping the movement of the beam. The adjustment of the disk 58 relative to the bottom of the cup 43 may be effected by turning knurled nut 59 any desired amount. The position of threaded rod 56 relative to the beam is secured at any desired position by means of the lock nut 60. It will be noted that, within certain limits, the closer to the bottom of the cup disk 58 is placed, the more pronounced will be the damping effect.

An important feature of the invention is the locking means by which the inertia member is held securely in place in its natural position of rest when the instrument is not in use. To accomplish this, the beam is locked in the center and at the end adjacent end piece 3 of the frame.

The locking means at the center of the beam will now be described. Referring particularly to Figs. 2 and 3, it will be seen that there is provided a cylindrical member 61 securely attached to the base of the instrument. There is provided integral with cylindrical member 61 the vertically extending spindle 62 which is threaded externally at its upper end. Surrounding the cylindrical member 61 and immovably secured to both cylindrical member 61 and the base of the instrument is the collar 63, having on its upper circumference the shoulder 64. Also mounted on the cylindrical member 61 is the vertically movable sleeve 65 having a downwardly extending shoulder 66 arranged oppositely to shoulder 64 on collar 63. The upper end of sleeve 65 is provided with a horizontally disposed portion 66 which is threaded at 67.

Extending down over and surrounding spindle 62 is a tubular bolt or connection 68 having a knurled head 69 internally threaded at 70 and externally threaded at 71. The external threads at 71 are twice the pitch of the internal threads at 70. The opening 71' in the beam is sufficiently large in diameter so that when the instrument is unlocked, there is no interference between the beam and the tubular bolt 68.

In Fig. 3, the beam is shown in the locked position. To unlock the beam, it is only necessary to unscrew knurled head 69, which, by virtue of the screw threads at 70, raises the lower horizontal face of the knurled head away from the upper surface of the beam. At the same time knurled head 69 is being raised relative to spindle 62, the upper horizontal portion of sleeve 65 is being lowered away from the undersurface of the beam. It follows, inasmuch as the threads at 71 have twice the pitch of those at 70, that the sleeve 65 will fall away from the undersurface of the beam at the same rate that the undersurface of knurled head 69 is raised from the upper surface of the beam. To lock the device, the operation is simply the reverse. Knurled head 69 is screwed down on spindle 62, thereby bringing the lower surface of the head and the upper surface of the beam into contact, and at the same time, the upper horizontal portion of sleeve 65 is being raised up to contact with the under horizontal surface of the beam. It will be noted that on account of the shoulder 64 on the immovable ring member 63 and shoulder 66 on the lower portion of sleeve member 65, no rotation of sleeve 65 is permitted although, of course, movement in a vertical direction may be freely had.

The locking of the beam is completely effected by the arrangement at that end of the beam which is nearest end piece 3, which arrangement is as follows: Integral with and projecting inwardly from end piece 3 is lug 72, having horizontally disposed therethrough a circular channel 73. Within the projections 23 and 24 of the beam 12 are circular passages 74 and 75, which, when the instrument is at rest, are in alignment with channel 73 in lug 72. A tapering pin 76 is passed through opening 74 in projection 23 into channel 73 in the lug 72. A second tapered pin, similar to pin 76, is thrust through opening 75 in projection 24 and passes into channel 73 in the lug. It will be seen, therefore, that with these tapered pins in place and the locking device previously described, which is located in the middle of the beam, screwed up tight, the inertia mass is securely locked against any motion whatever.

An important feature of the invention is the conversion of the vertical movement of the free end of the beam into the rotary or oscillatory motion of a reflecting mirror. This conversion is effected by novel means which will now be described.

Attached to the extreme vertical face of the free end of the beam is a clamp indicated generally at 77, a detail of which is shown in Fig. 9. This clamp affords means for detachably securing to the inertia mass two threads which transfer and convert the vertical motion of the free end of the beam into a rotary motion for a mirror which indicates the extent of the deflections of the beam.

Referring to Fig. 9, the clamp is composed of a base section 78 on which is mounted two blocks 79. For the sale of clearness, the block 79 which is nearer the observer is shown displaced from the base. The base section 78 and blocks 79 have been shouldered and cut away as at 80 and 81, so that the threads 82 and 83 may be attached to the clamp at as nearly a single point as possible. In base section 78, there is a cut-out portion 84 to provide for the free passage through the clamp of a link 85, the purpose of which will be more clearly explained hereinafter.

The entire clamp is secured to the vertical face of the free end of the beam by means of screws 86 which extend into the body of the beam. The blocks 79 and base section 78 are provided with slots 87 so that, when the screws 86 are loosened, entire clamp 77 may be moved horizontally so as to permit adjustment of the threads with respect to the longitudinal center of the beam. Base section 78 is further provided with studs 78' which are inserted in holes 79' in blocks 79. Thus, when screws 86 are loosened, blocks 79 and base 78 may be separated sufficiently to permit the threads to be placed in the clamp. This arrangement is desirable to facilitate the placing and locking of the threads in the clamp and between the base section 78 and the blocks 79. When in use, the threads 82 and 83 are attached to the clamp in the manner clearly shown by Fig. 9.

As a matter of fact there is used but a single strand of thread doubled back upon itself, but for practical purposes, it may be considered that there are two threads involved, which provide a connection between the inertia mass and the frame. One end of the thread is secured to the base of the instrument. Half-way between the base and the top of the frame, that is, at the position of rest of the inertia mass, the thread is rigidly secured to the free end thereof. The thread is passed to the top of the frame, over a supporting stud, and directed downwardly, and again secured rigidly to the free end of the beam. The lower end of the second thread is then returned to the base and firmly secured thereto.

With this arrangement, it would appear that unhindered movement of the free end of the beam is prevented, but this is not the case, inasmuch as the upper and lower ends of the threads are secured at points which are vertically adjustable. These points of attachment to the frame are moved downwardly and upwardly respectively toward the position of rest of the beam sufficiently to allow for a certain amount of slack in the thread between the suspension points on the frame and the points of attachment to the beam. This slack is taken up by a link interposed between and supported by the threads, the link having the double function of taking up the slack and producing a rotation of the mirror.

The adjusting means for securing the thread to the bottom of the instrument will now be described, with particular reference to Figs. 3, 8 and 10. The L-shaped angle piece 88 is secured rigidly to the base of the instrument by any suitable means, such as screws 89 shown in Fig. 8. The angle piece 88 is provided with a vertically disposed upright stud 90 which is internally bored and threaded and adapted to receive screw 91. Mounted in the L-shaped angle piece and receiving the stud 90 is the rectangular block 92 carrying the vertical adjusting screws 93, Fig. 8.

With particular reference to Fig. 10, which is a dissembled view of this device, it will be seen that on the vertical face of block 92, which is disposed rearwardly with reference to the angle piece 88, are short studs 94, which may also be seen in Figs. 3, 5, 8, and 13. The lower ends of the threads 82 and 83 are strung around these studs 94 in the manner shown in Fig. 10, and when the threads are properly in place, cleat 95 is brought into contact with the vertical face of rectangular block 92 and rigidly secured thereto by means of screws 96, not shown in Fig. 10, which pass through block 92 and screw into holes 97 provided for that purpose in cleat 95. It will be also noted that cleat 95 is provided with two holes 98 which register with studs 94 on block 92. From the arrangement as described, it will be readily seen that when cleat 95 is secured to block 92, the lower ends of the thread are firmly secured to the block, and to the base of the instrument.

Referring now to Fig. 8, and considering the relation between screw 91 and screws 93, it will be seen that block 92, to which the lower ends of the threads are secured, may be vertically adjusted within certain limits. To raise the block, it is only necessary to loosen screw 91, and screw down on screws 93. To lower the block, it is obvious that the reverse operation is necessary.

Secured to cross piece 8 is a means by which the upper supporting point of the thread may be vertically adjusted. This device is shown more clearly in Figs. 11 and 12, which are detail views of the associated parts. In Fig. 11, 8 represents the main cross piece, which has been previously mentioned in connection with the main frame, and which cross piece is shown in Figs. 1, 3, 5, 7 and 11. In the center of cross piece 8, there is provided the vertically disposed semi-cylindrical cut-out portion 99. On the rear of the base 100 of the thread clamp is the semi-cylindrical lug 101, shaped so as to have free vertical movement in opening 99 on cross piece 8. The base 100 is further provided with a stud 102 which projects forwardly from the base 100 and over which the thread is passed. Base 100 is provided with screw holes 103 which cooperate with corresponding holes 104 in cleat 105. Cleat 105 is further provided with a hole 106 which registers with and receives stud 102. When the thread has been passed over stud 102, cleat 105 is secured to the base 100 by means of screws 107 shown in Fig. 7.

Having reference now to Fig. 12, it will be seen that the semi-cylindrical lug 101 is bored and internally threaded to cooperate with screw 108, which bears on the upper surface of cross piece 8. The small clamp 109 receives and holds thin, flat, steel spring 110 which is disposed longitudinally underneath and bears against the underside of cross piece 8. The relation of spring 110 to cross piece 8 is clearly disclosed in Fig. 5. Clamp 109 is provided with a vertically disposed threaded stud 111 which is screwed into the threaded hole provided in lug 101. It will be seen, therefore, that any rotation of screw 108 will raise or lower lug 101, which in turn, of course, raises or lowers the position of stud 102, which is the point of suspension of the thread. Clamp 109 and spring 110, being likewise secured to semi-cylindrical lug 101, keep the lower face of screw 108 closely in contact with the upper surface of cross piece 8.

From the foregoing description, it will be seen that both upper and lower point of attachment of the thread to the frame of the instrument are vertically adjustable.

For a clear disclosure of the method of converting the vertical motion of the beam into a rotary motion of the mirror, reference is made to Fig. 13, which is a very much enlarged and rather diagrammatic perspective view of the thread suspension.

Studs 94 are the same as the correspondingly numbered studs described with reference to Figs. 3, 5, 8 and 10. Stud 102, shown at the top of the figure, is also disclosed clearly in Figs. 5, 11 and 12. Points on the thread 82 and 83, which are marked 112 and 112', represent the points of attachment of the threads to the free end of the arm. It will be recalled that the means of attaching the threads to the free end of the beam was described in connection with Fig. 9.

The link 85 comprises a thin rod having mounted thereon cross pieces 113 and 114. The rod is extended through cross piece 114 and has mounted on its upper end mirror 115. The ends of cross pieces 113 and 114 are provided with small slots as at 116 to receive the threads. It should be noted that cross pieces 113 and 114 are in the same plane vertically, and when the instrument is at rest, these cross pieces are disposed in a vertical plane which is parallel to the longitudinal sides of the instrument, and are held in this position by virtue of the opposed arrangement of the threads above and below the beam. Cross pieces 113 and 114 are spaced apart at a distance so that cross piece 113 is midway between studs 94 and point 112 when the instrument is at rest, and likewise so that cross piece 114 is midway between upper suspension stud 102 and point 112. Link 85 is held in place by a small knot 117 in thread 83, this knot being placed in the thread just underneath cross piece 113.

To follow out the course of the thread and the points to which it is attached to the arm and to the link 85, it will be seen that beginning at stud 94 to the right, the thread 82 extends upwardly and rearwardly, passes through slot 118 in cross piece 113 of the link, extends upwardly and forwardly to point 112, at which point it is rigidly secured to the free end of the beam; then extends upwardly and forwardly passing through slot 116 in cross piece 114, and thence up and over stud 102. From this point the same thread, this portion designated as 83, is passed downwardly and rearwardly through slot 119 in cross piece 114 and downwardly and forwardly to point 112', where it is rigidly secured to the free end of the beam, thence forwardly and downwardly through slot 120 in the forward end of cross piece 113, and then rearwardly and downwardly around the lower stud 94 at the left.

As to the operation of this portion of the device, assuming that points 112 and 112', the points of attachment of the thread to the free end of the beam, are moving downwardly, it will then be seen that the distance between point 112 and stud 102 is increasing and that the threads which extend between stud 102 and points 112 and 112' must straighten correspondingly causing a counter-clockwise rotation of cross piece 114. As the beam drops, the distance between points 112 and 112' and studs 94 is decreased, and ordinarily the threads between these two points would slacken and become loose. However, the same counter-clockwise rotation of cross piece 114 by virtue of the connecting rod, produces a corresponding counter-clockwise rotation in cross piece 113, which rotation completely takes up the slack which would be ordinarily produced in the threads between the points 112 and 94. It will be seen, therefore, that the counter-clockwise rotation of the link 85 caused by the straightening of the upper threads is just sufficient to exactly take up the slack which would otherwise be produced in the lower threads. As the link 85 is rotated, it is obvious that mirror 115 secured thereto rotates with the same speed and through the same angles.

Now, assuming that the beam and the points 112 and 112' are moving upwardly, its is apparent that the operation is just reversed. The lower threads straighten and cause a clockwise rotation of cross piece 113, which, of course, produces a corresponding clock-wise rotation in cross piece 114. As the distance between the beam and the top of the instrument decreases, the thread between would tend to slacken, but here again the slack is taken up by the clockwise rotation of cross piece 114. Consequently, the up-and-down motion of the beam produces no change whatever, (except for whatever minute change in tension the slight inertia of the link may contribute) in the tension of the threads, the tension in the threads always remaining constant. This holds true for all degrees of rotation of the link up to 90° each side of the position of rest.

It should be noted that the rate of rotation of the link increases per unit of displacement of the beam as the threads, either upper or lower, are straightened. The rate approaches infinity as the threads approach perfect straightness. Theoretically, the sensitivity of the instrument may be increased without limit by changing the position of rest of the beam by means of the adjusting screw 41. Actually, the sensitivity may be increased several times in this way.

If it should become necessary to rethread the instrument on account of breakage of the thread, the following procedure would be desirable. Link 85 would, of course, be out of the way, and the necessary length of thread would be looped over stud 102. Clamp 100, Fig. 11, should be first raised to its extreme upper position, while studs 94 on block 92 should be placed in their extreme lower position. The two strands of the thread then lie in a plane parallel to the end of the instrument. Both strands of the thread are firmly secured to the free end of the beam, according to the arrangement described in connection with Fig. 9, and then to block 92. At this point, it will be noted that the free end of the beam is fixed and cannot vibrate. Next, studs 94 are raised, and stud 102 lowered, in amounts sufficient to effect an appreciable slackness in the threads between the points of attachment to the instrument and the free end of the beam. Link 85 is then inserted in place, the link then taking up all the slack in the threads above and below the free end of the beam. The instrument is then ready for use.

Rigidly secured on the underside of cross piece 113 of link 85 is a small spring 122 shown in Fig. 5. The lower stem of this spring extends downwardly and is inserted between block 92 and clamp plate 95, see Fig. 3. The position of the downwardly extending stem of this spring 122 is secured by a tightening of thumb screw 123, shown in Figs. 2, 3 and 10. In some instances, it may be desirable to use this spring to aid in keeping the cross pieces 113 and 114 in a plane parallel to the sides of the instrument when the instrument is at rest. As a rule, this spring is unnecessary though, and in most instances may be disposed of entirely.

A modification of the thread suspension is shown in Fig. 14. In this form the threads connecting mass 12 with the lower part of the frame are eliminated.

In this modification the thread, having portions 135 and 136, is passed over the stud 102, and the lower ends secured to the free end of the inertia mass 12 by means of the clamp 77. Cross piece 137 has a somewhat X-shaped configuration, as shown in the drawing, and is provided, at its four corners, with slots, as at 138, to receive threads 135 and 136. Extending vertically through cross piece 137 is the small torsion spring 139, having therein loop 140, and secured at its lower end to inertia mass 12 as at 141. On the end of that portion of spring 139 which projects above cross piece 137 is mounted the mirror 115.

On account of the particular configuration of cross piece 137, it has contact with the threads at four points and is therefore self-supporting. The purpose of loop 140 is to allow for a small amount of lengthening and shortening of spring 139 as the arm 12 vibrates and as the distance between the arm and the cross piece 137 varies accordingly.

When the beam moves downwardly the threads straighten, and, against the resistance of torsion spring 139, rotate cross piece 137 and mirror 115 counter-clockwise. When the beam moves upwardly, the twist in spring 139, rotates cross piece 137 in a clockwise direction, and accordingly takes up the slack which would otherwise be produced in threads 135 and 136. It is apparent therefore, that the mirror oscillates in accordance with the vertical movement of the inertia mass.

The optical system of the instrument is completed by the provision of a slightly concave mirror 125, which rests generally in a vertical plane parallel to the sides of the instrument. This arrangement is clearly disclosed in Figs. 5 and 7. The mirror 125 is mounted on one side of a small sleeve 126, which rotates about a vertical axis defined by screw 127. The screw, sleeve, and mirror are all mounted in a block 128 which is secured in any desirable manner to cross piece 8 and to the longitudinal member 4 of the frame.

To the opposite side of sleeve 126 is secured the arm 129, which arm has sufficient length to extend over and into cross piece 7, as shown in Fig. 7.

The arm 129, sleeve 126, and mirror 125, being all mounted together to rotate about vertical axis 127, may be rotated through a small angle by means of the screw 130 and the spring-pressed plunger 131, which comprise an adjusting means commonly used on precision instruments of all varieties. As it is believed that this means of rotation is obvious from the disclosure on the drawing, no further description is deemed necessary.

The optical system of this instrument is simple. The flat mirror 115 is mounted on top of the link 85 with the plane of the mirror vertical and at 45° to the end of the instrument. Light from a small electric lamp located about three feet in front of end 2 of the instrument, goes through the open portion 11 in end piece 2, Fig. 4, and is reflected by this flat mirror against the stationary concave mirror 125, and back again to the flat mirror 115 and out to a recording camera located near the source of light. When the flat mirror oscillates, as it must when the link oscillates, the beam of light reflected into the recording camera moves back and forth in exact response to the motion of the link, the beam, and the motion of the earth.

This arrangement, whereby the light is reflected twice from the moving mirror, produces twice as great a displacement of the light beam entering the camera as a single reflection from the moving mirror would produce.

The stationary concave mirror 125 is of the proper curvature so that light entering from an electric lamp is brought to a focus on the photographic paper of the camera. The stationary concave mirror 125 can be rotated by means of the arm 129 described in connection with Fig. 7 through a small angle about the vertical axis 127, by means of the adjusting screw 130. This adjustment has the effect of swinging the beam of light which leaves the instrument so that it may be directed to the proper point on the photographic paper when the instrument is in a position of rest.

It should be understood that the word "thread" as used in the specification and claims is not limited to a fabric thread such as cotton or silk, but is intended to include all filaments suitable for the purpose, such as cotton or silk, or fine metallic wires rolled into the form of a flat ribbon, or in some instances a metallic chain made up of very fine links may be used.

Furthermore, to one skilled in the art, it is common knowledge that the inertia mass does not actually move itself, but that the real motion or vibration is in the frame. But for the purpose only of clearly explaining the action of this instrument, it has been assumed that the inertia mass itself vibrates in response to earth movements.

In the appended claims, the term "vertical component seismometer" is intended to define that type of instrument which responds to vibrations which are vertical with respect to the base of the instrument, or to the vertical component of such vibrations as are not vertical relative to the base.

Having thus described the invention, what is claimed as new and desired to be secured by Letters Patent is:

1. In a seismometer, a frame, an inertia mass, means for supporting said mass within said frame, a unitary connection between the mass and the frame, and means supported directly by said connection for indicating relative movements between the frame and the mass.

2. In a seismometer, a frame, an inertia mass, means for supporting said mass within said frame, a longitudinally flexible connection between the mass and the frame, and means supported by said connection for indicating relative movements between the frame and the mass.

3. In a seismometer, a frame, an inertia mass, means for supporting said mass within said frame, a unitary constant tension connection between the mass and the frame, and means supported by said connection for indicating relative movements between the frame and the mass.

4. In a seismometer, a frame, an inertia mass, means for supporting said mass within said frame, an oscillatable connection between the mass and the frame, said connection being extensible in operation and means supported by said connection for indicating relative movements between the frame and the mass.

5. In a seismometer, a frame, an inertia mass, means for supporting said mass within said frame and adapted to vibrate in a plane, and thread means suspended between the frame and the mass to transform the vibratory motion of the mass into an oscillatory motion in second plane at an angle to the first.

6. In a seismometer, a frame, an inertia mass, means for supporting said mass within said frame and adapted to vibrate in a plane, thread means suspended between the frame and the mass to transform the vibratory motion of the mass into an oscillatory motion in second plane at an angle to the first, and means supported by said thread to indicate the extent of such motion.

7. In a seismometer, a frame having oppositely disposed horizontal and vertical members, an inertia mass, means for suspending said mass within said frame, a unitary connection secured to a frame member, to the mass and to an oppositely disposed frame member, and means supported by said connection to indicate relative movements between the frame and the mass.

8. In a seismometer, a frame having oppositely disposed horizontal and vertical members, an inertia mass, means for suspending said mass within said frame, a unitary constant tension connection secured to a frame member, to the mass and to an oppositely disposed frame member, and means supported by said connection to indicate relative movements between the frame and the mass.

9. In a seismometer, a frame having oppositely disposed horizontal and vertical members, an inertia mass, means for suspending said mass within said frame, a thread connection secured to a frame member, to the mass and to an oppositely disposed frame member, and means supported by said connection to indicate relative movements between the frame and the mass.

10. In a seismometer, a frame having oppositely disposed horizontal and vertical members, an inertia mass, means for supporting said mass within said frame, a connection secured to a frame member, to the mass and to an oppositely disposed frame member, each portion of said connection disposed on opposite sides of the mass being extensible and oscillatable, and means supported by said connection for indicating relative movements between the mass and the frame.

11. In a seismometer, a frame having oppositely disposed horizontal and vertical members, an inertia mass, means for supporting said mass within said frame, thread means secured to a frame member, to the mass and to an oppositely disposed frame member, each portion of said means disposed on opposite sides of the mass being extensible and oscillatable, and means supported by said connection for indicating relative movements between the mass and the frame.

12. In a seismometer, a frame having oppositely disposed horizontal and vertical members, an inertia mass, means for suspending said mass within said frame, and adapted to vibrate in a plane, oscillatable and extensible thread means suspended between the mass and oppositely disposed frame members to transform the vibratory motion of the mass into an oscillatory motion in a second plane at an angle to the first.

13. In a seismometer, a frame having oppositely disposed horizontal and vertical members, an inertia mass, means for suspending said mass within said frame, and adapted to vibrate in a plane, oscillatable and extensible thread means suspended between the mass and oppositely disposed frame members to transform the vibratory motion of the mass into an oscillatory motion in a second plane at an angle to the first, and means supported and operated by said thread to indicate the extent of such motion.

14. In a seismometer, a frame, a horizontally disposed inertia mass, means for suspending said mass within said frame, one end of which is adapted to vibrate freely vertically in the frame, a connection between the free end of the mass and an adjacent frame member, and means supported by said connection for indicating the relative movements between the mass and the frame.

15. In a seismometer, a frame, a horizontally disposed inertia mass, means for suspending said mass within said frame, one end of which is adapted to vibrate freely in the frame, a constant tension connection between the free end of the mass and an adjacent frame member, and means supported by said connection for indicating the relative movements between the mass and the frame.

16. In a seismometer, a frame, a horizontally disposed inertia mass, means for suspending said mass within said frame, one end of which is adapted to vibrate freely in the frame, an oscillatable connection between the free end of the mass and an adjacent frame member, said connection being extensible in operation and means supported by said connection for indicating the relative movements between the mass and the frame.

17. In a seismometer, a frame having oppositely disposed horizontal and vertical frame members, a horizontally disposed inertia mass, means for suspending said mass within said frame, one end of which is adapted to vibrate freely in the frame, a connection secured to the frame, to the free end of the mass and to the oppositely disposed frame member, and means supported and operated by said connection to indicate relative movements between the mass and the frame.

18. In a seismometer, a frame having oppositely disposed horizontal and vertical frame members, a horizontally disposed inertia mass, means for suspending said mass within said frame, one end of which is adapted to vibrate freely in the frame, a connection secured to the frame, to the free end of the mass and to the oppositely disposed frame member, each portion of said connection disposed on opposite sides of the mass being extensible and oscillatable, and means supported and operated by said connection for indicating the relative movements between the frame and the mass.

19. In a seismometer, a frame, an inertia mass, means for supporting said mass within said frame, one end of which is adapted to vibrate freely, a connection between the free end of the mass and the frame comprising a pair of threads, each thread being secured to the free end of the mass and to a frame member, the threads having associated therewith, means to transform the motion of the free end of the mass into motion in another plane.

20. In a seismometer, a frame, an inertia mass, means for supporting said mass within said frame, one end of which is adapted to vibrate freely, a connection between the free end of the mass and the frame comprising a pair of threads, each thread being secured to the free end of the mass and to a frame member, the threads having associated therewith, means adapted to oscillate as the distance between the free end of the mass and the frame varies.

21. In a seismometer, a frame, an inertia mass, means for supporting said mass within said frame, one end of which is adapted to vibrate freely, a connection between the free end of the mass and the frame comprising a pair of threads, each thread being secured to the free end of the mass and to a frame member, the points, at which the threads are secured to the mass and to the frame lying in a common plane, the threads having associated therewith a link having a cross piece and an indicating means mounted thereon, means to hold said cross piece normally in a plane at right angles to the first mentioned plane, whereby the link and indicating means oscillate as the distance between the mass and the frame varies.

22. In a seismometer, a frame having oppositely disposed frame members, an inertia mass, means for supporting said mass within said frame, one end of which is adapted to vibrate freely, a connection between the mass and the frame, comprising a pair of threads each thread secured to a frame member, the free end of the mass and to an oppositely disposed frame member, the threads having associated therewith means adapted to oscillate as the distance between the free end of the mass and the frame varies.

23. In a seismometer, a frame having oppositely disposed frame members, an inertia mass, means for supporting said mass within said frame, one end of which is adapted to vibrate freely, a connection between the mass and the frame, comprising a pair of threads each thread secured to a frame member, the free end of the mass and to an oppositely disposed frame member, the points at which the threads are secured to the mass and the frame lying in a common plane, the threads having associated therewith a link, having a pair of cross pieces and an indicating means mounted thereon, the cross pieces lying normally in a plane at right angles to the first mentioned plane, whereby the link and indicating means oscillate as the distance between the mass and the frame varies.

24. In a seismometer, the structure according to claim 23 wherein the cross pieces of said link are disposed midway between the free end of the mass and the adjacent frame member to which the supporting thread is secured.

25. In a seismometer, a frame having oppositely disposed horizontal and vertical frame members, a horizontally disposed inertia mass, means for supporting said mass within said frame, one end of which is adapted to vibrate freely, a connection between the mass and the frame, comprising a pair of threads, each thread secured to a horizontally disposed frame member, the free end of the mass, and to the oppositely disposed frame member, the threads having associated therewith, means adapted to oscillate as the distance between the free end of the mass and the frame varies.

26. In a seismometer, a frame having oppositely disposed horizontal and vertical frame members, a horizontally disposed inertia mass, means for supporting said mass within said frame, one end of which is adapted to vibrate freely, a connection between the mass and the frame, comprising a pair of threads, each thread secured to a horizontally disposed frame member, the free end of the mass, and to the oppositely disposed frame member, the points at which the threads are secured to the mass and the frame lying in a common plane, the threads having associated therewith, a link having a pair of cross pieces and an indicating means mounted thereon, the cross pieces lying normally in a plane at right angles to the first mentioned plane, whereby the link and the indicating means oscillate as the distance between the mass and the frame varies.

27. In a seismometer, the structure according to claim 26 wherein there is mounted on the frame reflecting means, cooperating with the indicating means associated with said link, to magnify the motion of the free end of the mass.

28. In a seismometer, a frame, an inertia mass, means for supporting said mass within said frame, an inertia mass locking device comprising a spindle secured to a frame member, means movably mounted on said spindle and having oppositely disposed faces, a connection between said means, whereby the oppositely disposed faces approach or recede from each other at an equal rate.

29. In a seismometer, a frame, an inertia mass, means for supporting said mass within said frame, a thread connection between the mass and the frame, the thread secured to the frame by means comprising a frame cross piece having a transversely disposed groove, a clamp having the thread secured thereto and having a transfersely disposed projecting lug adapted to be received by said groove, and means cooperating with said lug and frame cross piece whereby said clamp is adjustable relative to said cross piece.

30. In a seismometer, a frame, an inertia mass, means for supporting said mass within said frame, a thread connection between the mass and the frame, the thread secured to the frame by means comprising an angle piece secured to the frame, a clamp, having the thread secured thereto, operatively connected to said angle piece by screw means whereby said clamp is adjustable relative to said angle piece.

31. A vertical component seismometer comprising a frame, an inertia mass, means for supporting said mass within said frame, a connection between the mass and the frame, and means supported by said connection for indicating relative movements between the frame and the mass.

32. In a seismometer, a frame, an inertia mass, means for supporting said mass within said frame, an extensible constant tension connection between the mass and the frame, and means supported by said connection for indicating relative movements between the frame and the mass.

33. In a seismometer, a frame, an inertia mass, means for supporting said mass within said frame, an extensible connection between the mass and the frame, and means supported by said connection for indicating relative movements between the frame and the mass.

34. A vertical component seismometer comprising a frame, an inertia mass, means for supporting said mass within said frame, a constant tension connection between the mass and the frame, and means supported by said connection for indicating relative movements between the frame and the mass.

35. A vertical component seismometer comprising a frame, a horizontally disposed inertia mass, means for suspending said mass within said frame, one end of which is adapted to vibrate freely in the frame, a connection between the free end of the mass and an adjacent frame member, and means supported by said connection for indicating the relative movements between the mass and the frame.

36. A vertical component seismometer comprising a frame, a horizontally disposed inertia mass, means for suspending said mass within said frame, one end of which is adapted to vibrate freely in the frame, an extensible connection between the free end of the mass and an adjacent frame member, and means supported by said connection for indicating the relative movements between the mass and the frame.

In testimony whereof I hereunto affix my signature.

HENRY G. TAYLOR.